(12) United States Patent
Lin et al.

(10) Patent No.: US 8,090,609 B2
(45) Date of Patent: Jan. 3, 2012

(54) METHOD FOR EVALUATING PERFORMANCE OF INTERNAL NETWORK IN AN ENTERPRISE

(75) Inventors: Yi-Kuei Lin, Taipei (TW); Shin-Guang Chen, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 500 days.

(21) Appl. No.: 12/289,989

(22) Filed: Nov. 10, 2008

(65) Prior Publication Data

US 2009/0319345 A1 Dec. 24, 2009

(30) Foreign Application Priority Data

Jun. 18, 2008 (TW) ................................ 97122686 A

(51) Int. Cl.
*G06Q 40/00* (2006.01)
(52) U.S. Cl. .......................................... 705/7.11; 705/7.1
(58) Field of Classification Search ............... 705/11
See application file for complete search history.

(56) References Cited

U.S. PATENT DOCUMENTS

| | | | | |
|---|---|---|---|---|
| 7,525,545 B2 * | 4/2009 | Brauss | ........................... | 345/440 |
| 7,609,637 B2 * | 10/2009 | Doshi et al. | .................. | 370/235 |
| 7,693,781 B2 * | 4/2010 | Asher et al. | ...................... | 705/37 |
| 7,711,628 B2 * | 5/2010 | Davie et al. | ...................... | 705/37 |
| 2003/0144868 A1 * | 7/2003 | MacIntyre et al. | ................. | 705/1 |
| 2003/0200133 A1 * | 10/2003 | Chu et al. | ........................ | 705/10 |
| 2004/0111358 A1 * | 6/2004 | Lange et al. | ..................... | 705/37 |
| 2005/0063384 A1 * | 3/2005 | De Jaegher et al. | ........... | 370/389 |
| 2005/0065805 A1 * | 3/2005 | Moharram | ......................... | 705/1 |
| 2006/0259339 A1 * | 11/2006 | Lind et al. | ......................... | 705/9 |
| 2008/0140490 A1 * | 6/2008 | Wang et al. | ....................... | 705/8 |
| 2010/0145755 A1 * | 6/2010 | Narkilahti | ......................... | 705/8 |

FOREIGN PATENT DOCUMENTS

EP 1524614 A1 * 4/2005

* cited by examiner

*Primary Examiner* — Thomas Dixon
*Assistant Examiner* — Benjamin S Fields
(74) *Attorney, Agent, or Firm* — Bacon & Thomas, PLLC

(57) ABSTRACT

An evaluating method for internal network performance by simulation of a flow network model with an acceptable threshold for the required flow of the internal network is applied to a computer system. The network model comprises plural nodes and document flow paths, wherein each said node corresponds to one employee of the internal network with a capacity, which is tested to get a testing result, and each said document flow path has a flow, which maps into a probability distribution data by a probability mapping function. According to the probability mapping function and operation relationship between the capacity and the flow together with the acceptable threshold and the probability distribution data, a system reliability value is calculated out and shown in a display screen.

16 Claims, 3 Drawing Sheets

METHOD FOR EVALUATING PERFORMANCE OF INTERNAL NETWORK IN AN ENTERPRISE

BACKGROUND OF THE INVENTION (1) Field of the Invention

The present invention relates to an method for evaluating performance of an internal network in an enterprise, particularly for one that assesses the performance of the internal network introduced in Enterprise Resources Planning (ERP) system.

(2) Description of the Prior Art

The Enterprise Resource Planning (ERP) system, which is a latest phase in the development of computerized systems for managing organizational resources, adopts a new management mode to reform outdated management mode of the internal network by effectively allocating and redeploying the existing financial accounting, human resources, information, technology, and hardware resources across an entire company for accomplishing the entrepreneurial business requirement in more effective way.

The conventional researches on the ERP system mostly stress on how to successfully introduce it in an enterprise, namely probe into the imperative redeployments during the procedure of introducing the ERP system such as organizational modification, process alteration, role change for project members, influences of introducing cost and time schedule, upgrade of the ERP system and the like that substantially impact the original enterprise ecology so that an optimal strategic method is worked out to successfully introduce the ERP system.

However, after introduction of the ERP system for managing the internal network composed of the staff, the internal network performance should be properly evaluated. But, most existing network evaluating methods are used to assess the efficiency for the Internet or traffic transportation network composed of hardware such as machine or road instead of effectively evaluating the internal network performance for the staff in an enterprise. Therefore, an effective evaluating method for predicting the throughput per unit time of the internal network governed by the ERP system becomes a requisite for the entrepreneur to assessing the Return on Investment (ROI) of the ERP system.

SUMMARY OF THE INVENTION

The object of the present invention is to provide an evaluating method for internal network performance, which may be used to assess the implementation efficiency of the internal network in composition of employees.

The other objects and advantages of the present invention may be further understood from the technological features disclosed below.

For accomplishing one, partial or all the objects as well as other objects, one exemplary preferred embodiment of the present invention provides an method for evaluating the performance of the internal network in an enterprise, which is applied in a computer system such as the Enterprise Resources Planning (ERP) system or Customer Relationship Management (CRM) system and the like, for assessing the implement efficiency of the internal network when such ERP or CRM computer system is introduced into the internal network, wherein said computer system includes a relevant software program stored in the suitable memory media for being run by a microprocessor to execute related calculation; and said internal network comprises plural employees.

Said performance evaluating method comprises procedure steps as below.

Provided in the software program is a flow network model, which corresponds an internal network in simulation and comprises plural nodes and plural document flow paths, wherein each of nodes corresponds each employee in responsible for the specific business task/operation while each document flow path is configured by the nodes.

In the flow network model, each node is assigned a capacity (short for document processing capacity) and each document flow path is assigned a flow (short for document flow rate), wherein an operation relationship exists between said capacity and flow. The group of all the document flow rates in corresponding to each document flow path is defined as "flow vector", and the group of all the processing capacity in corresponding to each node is defined as "capacity vector".

Determine an acceptable threshold (namely acceptable level) for the total required flow of the flow network model and store the acceptable threshold in said memory media.

Set up an ability test procedure to test all the employees in corresponding to each node so as to obtain a probability distribution data, which denotes individual various capacity of document being successfully processed for each employee of node, and store it in said memory media;

Search the probability distribution data in said memory media for selecting out a maximal processing capacity for each node.

Run said software program to read the acceptable threshold and the maximal processing capacities in the memory media so as to calculate out all the possible flow vectors in accordance with the operation relationship between the maximal processing capacities and the document flow rates.

Figure out all the possible capacity vectors in accordance with all the possible flow vectors and the operation relationships.

Select out the minimal capacity vectors from all the possible capacity vectors.

Basing on the probability distribution data and the minimal capacity vectors, a value of system reliability, which denotes the probability of that the total document flow successfully processed by the flow network model is greater than the acceptable threshold d, is calculated out and shown in a display screen.

In a exemplary preferred embodiment, said plural nodes comprise a source node, multiple succeeding nodes and a destination node so that all the document flow paths start from the source node and end at the destination node via certain succeeding nodes.

Said plural document flow paths is configured by the steps as below: define at least a process precedence relationship between every two nodes; and define said plural document flow paths in accordance with foregoing process precedence relationships.

Said operation relationship between said processing capacity and document flow includes that the sum of all document flow values processed from all document flow paths passing the same employee of node is not greater than a maximal processing capacity; and that in a given time point, the sum of all document flow values flowed simultaneously from all document flow paths passing the same employee of node is not greater than a current capacity of the node.

Said ability test procedure, which acts on every employee in corresponding to each node, comprises practical steps as below: firstly, provide plural different test capacities for each employee to undertake capacity test; secondly, record each testing result of each employee into the memory media of the computer system in binary digit; thirdly, offer a probability mapping function, which comprises the test capacities, the binary digit and definition of a functional relationship between the output value of probability and the input arguments thereof; and fourthly, run said probability mapping function for calculation to obtain a probability distribution data output, which displays each probability of each testing result for each node under different capacity.

DESCRIPTION OF THE PREFERRED EMBODIMENTS

It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," and "coupled," and variations thereof herein are used broadly and encompass direct and indirect connections, couplings, and mountings.

The present invention relates to an evaluating method for internal network performance, which is applied in a computer system such as the Enterprise Resources Planning (ERP) system or Customer Relationship Management (CRM) system and the like, for assessing implement efficiency of the internal network when such ERP or CRM system is introduced into the internal network. The internal network comprises plural employees and the process precedence relationship of the document handled by individual employee. The computer system for implementing the evaluating method for internal network performance should include at least a relevant software program stored in the suitable memory media for being run by a microprocessor to execute related calculation.

Figure 1:
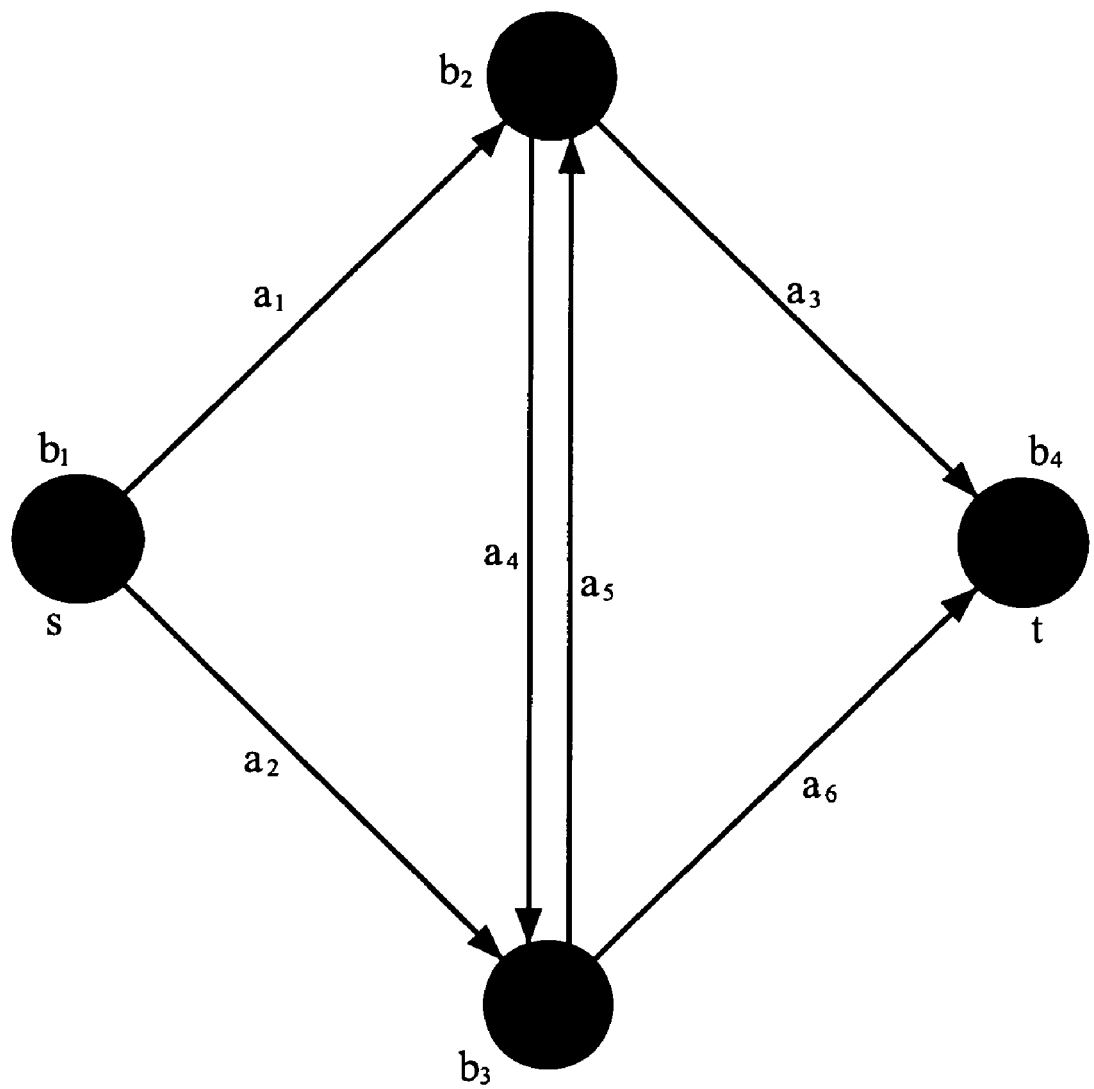
FIG. 1 is the schematic view showing a flow network model of internal network simulation for one exemplary preferred embodiment in the present invention.

FIG. 1 shows a simple flow network model, which is provided in the software program, for simulating substantial internal network, wherein each of nodes $b_1$, $b_2$, $b_3$ and $b_4$ denotes employee in responsible for the specific business task/operation, s node is the source node, t node is the destination node, colloquially also called end node or sink, while other nodes are succeeding nodes; each of arrowheads $a_1$, $a_2$, $a_3$, $a_4$, $a_5$ and $a_6$ indicates a process precedence relationship between two linked nodes of said nodes $b_1$, $b_2$, $b_3$ and $b_4$ for denoting the direction of the document processing flow; multiple document flow paths are configured by the nodes $b_1$, $b_2$, $b_3$ and $b_4$ and the process precedence relationships; for examples all $P_1=\{b_1, b_2, b_4\}$, $P_2=\{b_1, b_2, b_3, b_4\}$, $P_3=\{b_1, b_3, b_4\}$, $P_4=\{b_1, b_3, b_2, b_4\}$ being document flow paths in the FIG. 1. In this exemplary embodiment, all the document flow paths $P_i$ (hereinafter the i means 1, 2, 3 or 4 and so on) initiate from same source node s and terminate at the destination node t via certain succeeding nodes; the minimal path technique (MPT), which creates flow path without loop, is adopted as definition rule for the document flow path $P_i$.

Moreover, each of items $f_1$, $f_2$, $f_3$ and $f_4$ is defined as respective document flow rate, colloquially also called document flow or simply flow, for each of document flow paths $P_1$, $P_2$, $P_3$ and $P_4$; notation d is defined as the acceptable level, virtually also called acceptable threshold, for the total required document flow to be processed in a given time interval. In this embodiment, said acceptable threshold d is set to 5, namely d=5, and stored in the memory media.

For understanding the maximal capacity $m_i$, which is defined as the maximal document quantity may be processed in a given time interval for each node of $b_1$, $b_2$, $b_3$ or $b_4$, all the employees corresponding to each node of $b_1$, $b_2$, $b_3$ or $b_4$ are required to take an on-job teaching/training course for familiarizing the related document processing task respectively, and required to accept an ability test procedure to examine individual document processing ability of various document quantity in the given time interval for each employee involved in the internal network.

The ability test procedure comprises practical steps as below:

Firstly, provide plural different tests for each employee to undertake capacity test;

Secondly, record each testing result of each employee into the memory media of the computer system in binary digit, and let "0" stand for failed instance while "1" stand for passed (successful) instance as the testing result; and Thirdly, offer a probability mapping function $D_i$ with relevant calculation to obtain a probability distribution data output, which displays each probability of each testing result for each node under different capacity $x_i$ (as shown in the Table 2) and to be stored in the memory media, wherein said probability mapping function $D_i$ defines a functional relationship between the output value of probability and the input arguments of testing capacity together with testing result in binary digit.

Table 1 lists each testing result and the corresponding probability mapping function $D_1$, $D_2$, $D_3$ and $D_4$ for each node of $b_1$, $b_2$, $b_3$ and $b_4$. For example, the testing result for node $b_1$ is "passed" (successful) with corresponding probability mapping function being $D_1(1)$ while the testing result for node $b_2$ is "failed" (unsuccessful) with corresponding probability mapping function being $D_2(0)$ and so on by deducing analogy.

TABLE 1

|  | Persons (Nodes) | | | |
| --- | --- | --- | --- | --- |
|  | $b_1$ | $b_2$ | $b_3$ | $b_4$ |
| Exam. | passed | failed | passed | passed |
| Prob. Distribution | $D_1(1)$ | $D_2(0)$ | $D_3(1)$ | $D_4(1)$ |

Table 2 lists each mapped probability value in corresponding with various document processing capacity $x_i$ for each node of $b_1$, $b_2$, $b_3$ and $b_4$ with corresponding probability mapping function $D_i$ of testing result, wherein the number of 0~6 on the top first row denotes different document processing capacity $x_i$ while each $D_i$ on the left first column is the corresponding probability mapping function $D_i$ for each testing result of "passed" (1) or "failed" (0).

When the evaluating method for internal network performance of the present invention is run on the relevant computer, the computer will search Table 2 for finding each mapped probability value in corresponding with various processing capacity $x_i$ for each node of $b_1$, $b_2$, $b_3$ and $b_4$ and the corresponding probability mapping function $D_i$ in accordance with the testing result of Table 1, which shows probability mapping function $D_1$ is $D_1(1)$ as the testing result of $b_1$ is "passed" (1), probability mapping function $D_2$ is $D_2(0)$ as the testing result of $b_2$ is "failed" (0), probability mapping function $D_3$ is $D_3(1)$ as the testing result of $b_3$ is "passed" (1) and probability mapping function $D_4$ is $D_4(1)$ as the testing result of $b_4$ is "passed" (1) respectively.

For example, when processing capacity $x_1$ is 6 for the $b_1$ of "passed" (1) testing result, the probability value looked up from the Table 2 is 0.2 in accordance with adopted probability mapping function $D_1(1)$. The maximal testing capacity in the exemplary ability test procedure is 6 documents, which means the maximal processing capacity $m_i$ in the given time interval for the testing node $b_1$ is $m_1=6$, so that the probability value is 0.2 instead of 0.

By the same token, when processing capacity $x_2$ is 6 for the $b_2$ of "failed" (0) testing result, the probability value looked up from the Table 2 is 0.0 in accordance with adopted probability mapping function $D_2$ (0), which means the testing node $b_2$ in the given time interval can not process 6 documents. However, when processing capacity $x_2$ is 5 for the $b_2$ of "failed" (0) testing result, the probability value looked up from the Table 2 is 0.001 in accordance with adopted probability mapping function $D_2$ (0), which means the maximal processing capacity $m_i$ in the given time interval for the testing node $b_2$ is $m_2=5$, so that the probability value is 0.001 instead of 0.

TABLE 2

| Mapping Functions | 0 | 1 | 2 | 3 | 4 | 5 | 6 |
|---|---|---|---|---|---|---|---|
| $D_1(1)$ | 0.002 | 0.003 | 0.005 | 0.01 | 0.13 | 0.65 | 0.20 |
| $D_1(0)$ | 0.23 | 0.60 | 0.10 | 0.012 | 0.0555 | 0.0025 | 0.0 |
| $D_2(1)$ | 0.001 | 0.002 | 0.01 | 0.02 | 0.10 | 0.7 | 0.167 |
| $D_2(0)$ | 0.20 | 0.67 | 0.11 | 0.012 | 0.007 | 0.001 | 0.0 |
| $D_3(1)$ | 0.002 | 0.003 | 0.01 | 0.01 | 0.10 | 0.6 | 0.275 |
| $D_3(0)$ | 0.30 | 0.55 | 0.125 | 0.012 | 0.01 | 0.003 | 0.0 |
| $D_4(1)$ | 0.002 | 0.003 | 0.01 | 0.01 | 0.10 | 0.7 | 0.175 |
| $D_4(0)$ | 0.175 | 0.50 | 0.30 | 0.012 | 0.01 | 0.003 | 0.0 |

According the sorted testing results from the Table 1 and Table 2, the maximal processing capacity $m_i$ in the given time interval for each testing node of $b_1$, $b_2$, $b_3$ and $b_4$ is $m_1=6$, $m_2=5$, $m_3=6$ and $m_4=6$ respectively. Thereby, read the values of acceptable threshold d and each maximal processing capacity $m_i$ in the memory media by running relevant software program on the basis of operation relationship between values for each processing capacity $x_i$ and each document flow rate $f_j$, the value for each document flow rate of $f_1$, $f_2$, $f_3$ and $f_4$ may be derived out.

enumerate $f_j$ for $1 \leq j \leq 4$, $0 \leq f_j \leq 6$ do
if $f_j$ satisfies the following equations $$f_1+f_2+f_3+f_4 \leq 6, f_1+f_2+f_4 \leq 5, f_2+f_3+f_4 \leq 6, f_1+f_2+f_3+f_4 \leq 6$$
$$\text{and } f_1+f_2+f_3+f_4 = 5$$

then $F = F \cup \{F\}$
endif
end enumerate
Where,
$f_j$ is the document flow rate for each document flow path $P_j$;
j is the subscript for indicating the ordinal number of each document flow path $P_j$;

F is a group, which is composed of all the document flow value $f_j$ in corresponding to each document flow path $P_j$ respectively, being expressed in vector way with name of "flow vector";

F is a set of flow vector F.

Each document flow rate $f_j$ in corresponding to each document flow path $P_j$ respectively is different from time to time so that the set F of flow vector F will have the following result:
$\{(0, 0, 0, 5), (0, 0, 1, 4), (0, 0, 2, 3), (0, 0, 3, 2), (0, 0, 4, 1), (0, 0, 5, 0), (0, 1, 0, 4), (0, 1, 1, 3), (0, 1, 2, 2), (0, 1, 3, 1), (0, 1, 4, 0), (0, 2, 0, 3), (0, 2, 1, 2), (0, 2, 2, 1), (0, 2, 3, 0), (0, 3, 0, 2), (0, 3, 1, 1), (0, 3, 2, 0), (0, 4, 0, 1), (0, 4, 1, 0), (0, 5, 0, 0), (1, 0, 0, 4), (1, 0, 1, 3), (1, 0, 2, 2), (1, 0, 3, 1), (1, 0, 4, 0), (1, 1, 0, 3), (1, 1, 1, 2), (1, 1, 2, 1), (1, 1, 3, 0), (1, 2, 0, 2), (1, 2, 1, 1), (1, 2, 2, 0), (1, 3, 0, 1), (1, 3, 1, 0), (1, 4, 0, 0), (2, 0, 0, 3), (2, 0, 1, 2), (2, 0, 2, 1), (2, 0, 3, 0), (2, 1, 0, 2), (2, 1, 1, 1), (2, 1, 2, 0), (2, 2, 0, 1), (2, 2, 1, 0), (2, 3, 0, 0), (3, 0, 0, 2), (3, 0, 1, 1), (3, 0, 2, 0), (3, 1, 0, 1), (3, 1, 1, 0), (3, 2, 0, 0), (4, 0, 0, 1), (4, 0, 1, 0), (4, 1, 0, 0), (5, 0, 0, 0)\}$.

The processing capacity $x_i$ for each employee should be the sum of all document flow value $f_j$ having been processed because the employee of each node $b_1$, $b_2$, $b_3$ and $b_4$ has probably to process various documents from multiple document flow paths $P_j$. Let the group, which is composed of all the processing capacity $x_i$ in corresponding to each node $b_j$ respectively, be expressed in vector way as $X=(x_1, x_2, x_3, x_4)$ with name of "capacity vector", then by employing all the possible flow vectors F aforesaid, the capacity vector $X=(x_1, x_2, x_3, x_4)$ may be obtained from the following operation relationship:

for F in F do $$\chi_1=f_1+f_2+f_3+f_4, \chi_2=f_1+f_2+f_4, \chi_3=f_2+f_3+f_4, \chi_4=f_1+f_2+f_3+f_4$$

$U_X = U_X \cup \{X_F\}$ //where $X_F=(\chi_1, \chi_2, \chi_3, \chi_4)$ may have duplicates.
endfor
for X in $U_X$ do //Remove the redundant vectors.
if $X \notin \Omega$ then $\Omega = \Omega \cup \{X\}$
endif
endfor The processing capacity $x_i$ for each employee of node $b_1$, $b_2$, $b_3$ and $b_4$ is different from time to time, so different capacity vectors X may be obtained as below:
$\{X_1=(5, 5, 0, 5), X_2=(5, 5, 1, 5), X_3=(5, 4, 1, 5), X_4=(5, 5, 2, 5), X_5=(5, 4, 2, 5), X_6=(5, 3, 2, 5), X_7=(5, 5, 3, 5), X_8=(5, 4, 3, 5), X_9=(5, 3, 3, 5), X_{10}=(5, 2, 3, 5), X_{11}=(5, 5, 4, 5), X_{12}=(5, 4, 4, 5), X_{13}=(5, 3, 4, 5), X_{14}=(5, 2, 4, 5), X_{15}=(5, 1, 4, 5), X_{16}=(5, 5, 5, 5), X_{17}=(5, 4, 5, 5), X_{18}=(5, 3, 5, 5), X_{19}=(5, 2, 5, 5), X_{20}=(5, 1, 5, 5), X_{21}=(5, 0, 5, 5)\}$.

Next, among the foregoing capacity vectors of different capacity variety, select out minimal capacity vectors $X_n$ to form a minimal set $\Omega_{min}$ as below:
$\{X_1=(5, 5, 0, 5), X_3=(5, 4, 1, 5), X_6=(5, 3, 2, 5), X_{10}=(5, 2, 3, 5), X_{15}=(5, 1, 4, 5), X_{21}=(5, 0, 5, 5)\}$.

The operation procedure described above is a method of Operation Research (OR), where in the minimal set $\Omega_{min}$, each minimal capacity vector $X_n$, which serves as a lower boundary point for the method of Operation Research (OR), means minimal human resources in the internal network is to be employed to accomplish the acceptable threshold d of required document flow, which is the mission expected by the entrepreneur, in maximal efficiency.

Then, basing on the minimal set $\Omega_{min}$ composed of the probability distribution data in the Table 2 and the minimal capacity vectors $X_n$, a system reliability $R_d$, which denotes the probability of that the total document flow successfully processed by the flow network model is greater than the acceptable threshold d, is calculated out and shown in a display screen. In other words, the system reliability $R_d$ means the probability of that the internal network can meet the requirement by the entrepreneur. In the exemplary embodiment, the system reliability $R_d$ is calculated out by applying the inclusion-exclusion principle of the probability theory. Under the instance of the acceptable level d=5 for at least 5 documents being able to complete in the given time interval, the system reliability $R_5$=0.7114, which is a probability to be served as a performance index of the internal network, is figured out by the following calculation:

$$R_5 = Pr\{\bigcup_{i=1}^{6} B_i\}$$

$$= \sum_{i=1}^{6} Pr\{B_i\} - \sum_{1 \leq i<j \leq 6} Pr\{B_i \cap B_j\} + \sum_{1 \leq i<j<k \leq 6} Pr\{B_i \cap B_j \cap B_k\} -$$

$$\sum_{1 \leq i<j<k<l \leq 6} Pr\{B_i \cap B_j \cap B_k \cap B_l\} +$$

$$\sum_{1 \leq i<j<k<l<m \leq 6} Pr\{B_i \cap B_j \cap B_k \cap B_l \cap B_m\} -$$

$$\sum_{1 \leq i<j<k<l<m<n \leq 6} Pr\{B_i \cap B_j \cap B_k \cap B_l \cap B_m \cap B_n\}$$

$$= \sum_{i=1}^{6} \prod_{r=1}^{4} Pr\{x_r \geq X_{ir}\} -$$

$$\sum_{1 \leq i<j \leq 6} \prod_{r=1}^{4} Pr\{x_r \geq x_{wr} \mid x_{wr} = \max(X_{ir}, X_{jr})\} +$$

$$\sum_{1 \leq i<j<k \leq 6} \prod_{r=1}^{4} Pr\{x_r \geq x_{wr} \mid x_{wr} = \max(X_{ir}, X_{jr}, X_{kr})\} -$$

$$\sum_{1 \leq i<j<k<l \leq 6} \prod_{r=1}^{4} Pr\{x_r \geq x_{wr} \mid x_{wr} = \max(X_{ir}, X_{jr}, X_{kr}, X_{lr})\} +$$

$$\sum_{1 \leq i<j<k<l<m \leq 6} \prod_{r=1}^{4} Pr\{x_r \geq x_{wr} \mid x_{wr} = \max(X_{ir}, X_{jr}, X_{kr}, X_{lr}, X_{mr})\} -$$

$$\sum_{1 \leq i<j<k<l<m<n \leq 6} \prod_{r=1}^{4} Pr\{x_r \geq x_{wr} \mid x_{wr} = \max(X_{ir}, X_{jr}, X_{kr}, X_{lr}, X_{mr}, X_{nr})\}$$

$$= 1.3476 - 0.7680 + 0.1652 - 0.0412 + 0.0085 - 0.0007$$

$$= 0.7114$$

Where, $B_i$ denotes the following boundary conditions:

$$B_1=\{X|X \geq X_1\}, B_2=\{X|X \geq X_3\}, B_3=\{X|X \geq X_6\},$$

$$B_4=\{X|X \geq X_{10}\}, B_5=\{X|X \geq X_{15}\} \text{ and } B_6=\{X|X \geq X_{21}\}$$

Figure 2:
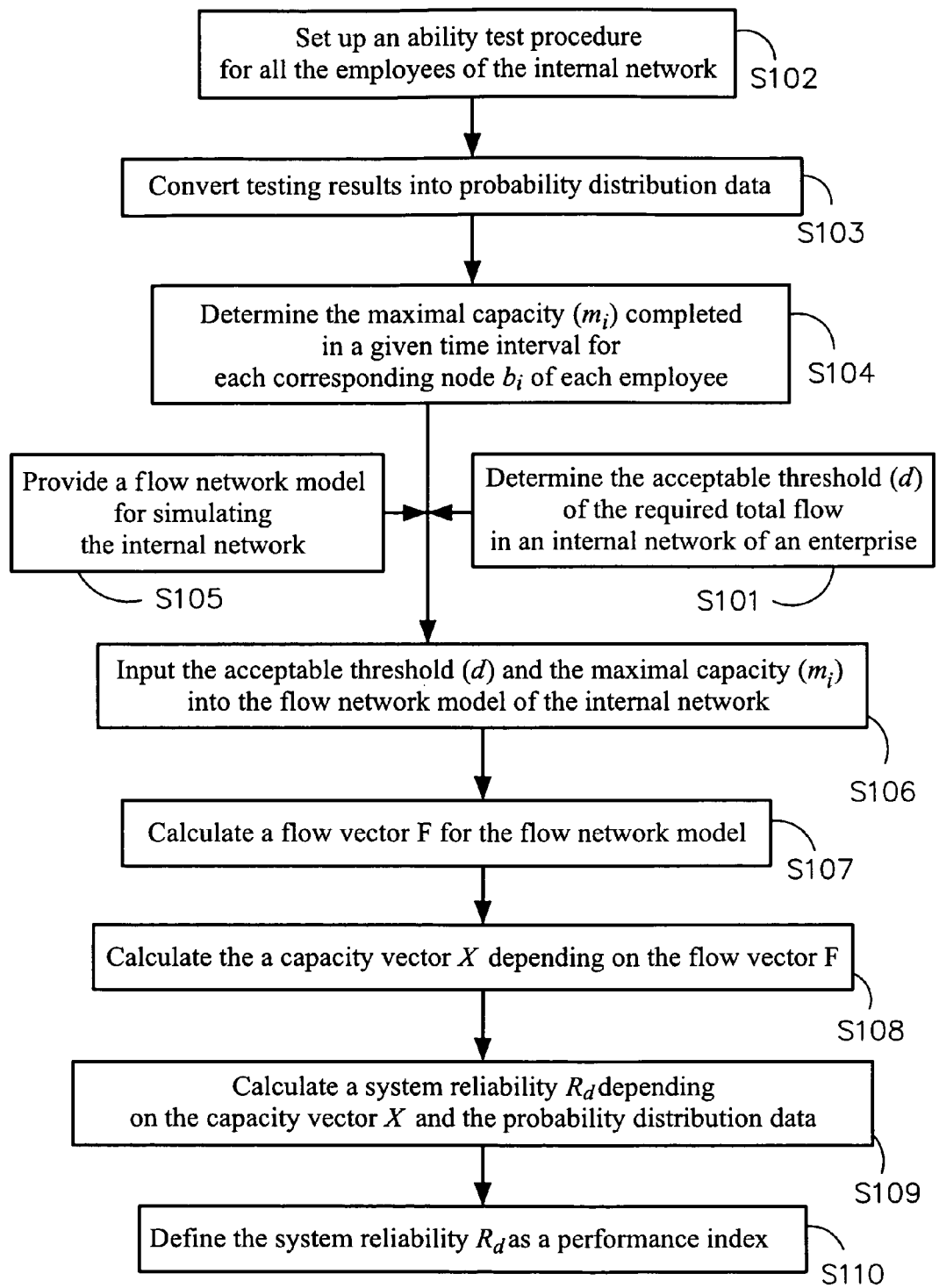
FIG. 2 is the schematic view of flow chart showing an evaluating method for internal network performance by simulation of a flow network model for one exemplary preferred embodiment in the present invention.

FIG. 2 is a flow chart showing an evaluating method for internal network performance by simulation of a flow network model for one exemplary preferred embodiment in the present invention.

The procedure steps of the evaluating method are described below in detailed manner:

Firstly, the entrepreneur must determine the acceptable threshold d of the required total flow processed by the internal network in a given time interval (S101), then set up an on-job teaching/training course and an ability test procedure for all the employees to take so as to examine individual document processing capability of various document quantity in the given time interval for each employee involved in the internal network (S102).

Secondly, convert forgoing testing results into probability via computer system to obtain each probability value in completing various processing capacity $x_i$ for each node $b_i$ in the internal network so that a set of probability distribution data is composed of these probability values (S103).

Thirdly, determine the maximal capacity $m_i$ which may be completed in a given time interval for each node $b_i$ by employing the probability distribution data aforesaid (S104).

Fourthly, provide a flow network model for the Internal network as shown in the FIG. 1 by configuration of plural document flow paths $P_j$, which is defined by the process precedence relationship between two nodes $b_i$ in the internal network so that the documents may be delivered for processing via these document flow paths $P_j$ (S105).

Fifthly, allot the acceptable threshold d for the required total flow expected by the entrepreneur onto the document flow paths $P_j$ determined to find out all corresponding document flow rates $f_j$ (S106).

Sixthly, basing on the maximal capacity $m_i$ preferably, each document flow $f_j$ in corresponding to each document flow paths $P_j$ and flow vector F composed thereof are figured out (S107).

Seventhly, allot the document flow rate $f_j$ onto each node $b_j$ respectively of each document flow paths $P_j$ to figure out various conditions of the processing capacity $x_i$ required for each node $b_i$ in the internal network from time to time so that a capacity vector X is defined therefrom (S108), wherein the processing capacity $x_i$ for each employee of node $b_i$ should be the sum of all document flow value $f_j$ processed from all document flow paths $P_j$ passing the employee of node $b_i$ owing to multiple document flow paths $P_j$ possibly passing same employee of node $b_i$.

Preferably, the operation relationship between the processing capacity $x_i$ and the document flow rate $f_j$ is as below:

1. The sum of all document flow rates $f_j$ processed from all document flow paths $P_j$ passing the same employee of node $b_i$ is not greater than the maximal capacity;

2. In a given time point, the sum of all document flow rates $f_j$ flowed simultaneously from all document flow paths $P_j$ passing the same employee of node $b_i$ is not greater than a current capacity of the node.

Then, because the processing capacity $x_i$ for each employee of node $b_i$ is different from time to time, so minimal capacity vectors $X_n$ are selected out from various capacity vectors of different capacity $x_i$ variety to form an minimal set $\Omega_{min}$, which includes all various conditions of the processing capacity $x_i$ serving as a means of minimal human resources in the internal network is to be employed to accomplish the acceptable threshold d of required total document flow.

Finally, a system reliability $R_d$ (S109), which denotes the probability of that the total document flow successfully processed by the flow network model is greater than the acceptable threshold d, is calculated out and shown in a display screen (S110).

Figure 3:
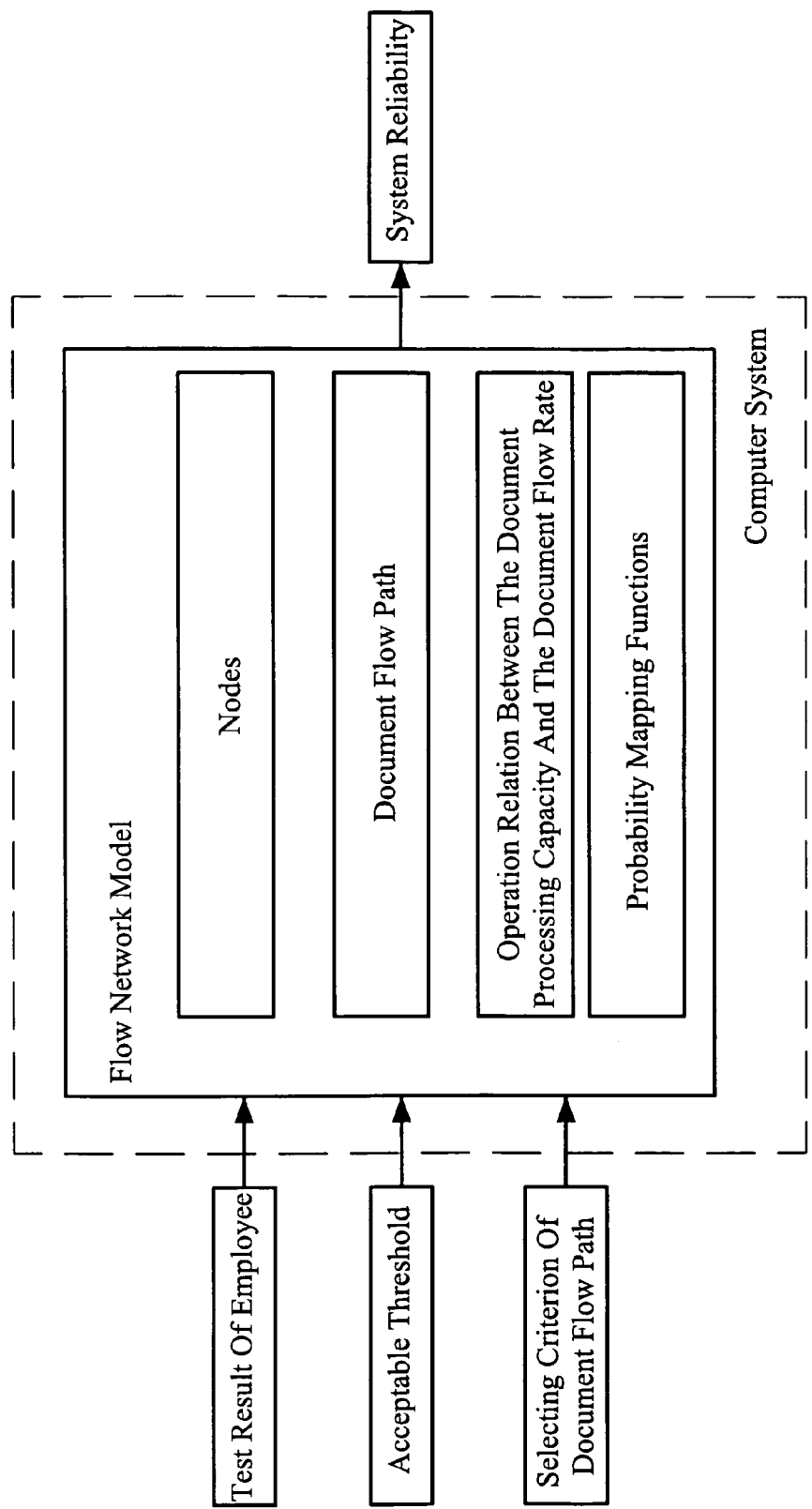
FIG. 3 is the schematic view of block diagram showing the functions in a flow network model of internal network simulation for one exemplary preferred embodiment in the present invention.

FIG. 3 is a block diagram showing the input conditions and the output result in a flow network model of internal network simulation for one exemplary preferred embodiment in the present invention. The input conditions include three items:

1. Test result of employee: the maximal processing capacity $m_i$;

2. Acceptable threshold d, which is the acceptable level of required total document flow expected by the entrepreneur;

3. Selecting criterion of document flow path $P_j$, which is configured by the nodes $b_i$ and the process precedence relationships in accordance with the minimal path technique (MPT).

After the calculation from the evaluating method for internal network performance of the present invention, the output result is the system reliability $R_d$ denoting the total document flow completed being greater than the acceptable threshold d.

However, all the disclosure heretofore is only the exemplary preferred embodiments of the present invention, which is not intended for limiting the range of the embodiment and the scope of the claim for the present invention. Accordingly, any simple equivalent alteration and modification, which does not depart from the essence and content of the specifications, should be reckoned as in the range of the claims by the present invention. Specifically, any embodiment or claim of the present invention does not be required to achieve all the objects, advantages or features. Moreover, the abstract of the disclosure and the title are only used for serving as auxiliary search index instead of limiting the claim range of the present invention.

What is claimed is:

1. A method for evaluating a performance of an internal network in an enterprise, wherein the internal network is formed by a plurality of employees of the enterprise, the method is applied by a computer system, and said computer system includes a software program, a memory media and a microprocessor, the software program being stored in the memory media for being run by the microprocessor, said method comprising the steps of:

providing a flow network model in the software program, wherein the flow network model comprises plural nodes and plural document flow paths, each of the nodes corresponding to one of the employees, wherein each document flow path is configured by the nodes;

assigning a document processing capacity for each of the nodes in the flow network model, and assigning a document flow rate for each of the document flow paths, so as to form an operation relationship between said document processing capacity and said document flow rate;

providing a probability mapping function in the software program;

setting up an accept ability test procedure to test all the employees corresponding to each node so as to obtain a testing result for each employee;

converting the testing result into a probability distribution data by means of the probability mapping function; and storing the probability distribution data in said memory media;

providing an acceptable threshold for the total required flow of the internal network to the flow network model and storing the acceptable threshold in said memory media; and performing an operation on the acceptable threshold and the probability distribution data by way of the operation relationship between said document processing capacity and said document flow rate as well as the probability mapping function in the flow network model, so as to obtain a value of system reliability showing in a display screen.

2. The method of claim 1, wherein said plural nodes comprise a source node, a plurality of succeeding nodes and a destination node so that all the document flow paths start from the source node and end at the destination node via the succeeding nodes.

3. The method of claim 1, wherein said plural document flow paths are configured by steps of: defining at least a process precedence relationship between every two nodes; and defining said plural document flow paths in accordance with foregoing process precedence relationships.

4. The method of claim 1, wherein said operation relationship between said document processing capacity and document flow rate comprises that the sum of all document flow rates processed from all document flow paths passing the same employee of node is not greater than a maximal processing capacity.

5. The method of claim 1, wherein said operation relationship between said document processing capacity and document flow rate comprises that in a given time point, the sum of all document flow rates flowed simultaneously from all document flow paths passing the same employee of node is not greater than a current capacity of the node.

6. The method of claim 1, wherein said step of setting up the accept ability test procedure to test all the employees corresponding to each node comprising:

providing plural different test capacities for each employee to undertake capacity test;

recording each testing result of each employee into the memory media of the computer system in a binary digit; and running said probability mapping function for calculation in accordance with the test capacities and the binary digits to obtain the probability distribution data, which comprises the probabilities of that each node successfully processes different capacities.

7. The method of claim 1, wherein said computer system is an Enterprise Resources Planning (ERP) system.

8. The method of claim 1, wherein said computer system is a Customer Relationship Management (CRM) system.

9. A method for evaluating a performance of an internal network in an enterprise, wherein the internal network is formed by a plurality of employees of the enterprise, the method is applied by a computer system, and said computer system includes a software program, a memory media and a microprocessor, the software program being stored in the memory media for being run by the microprocessor, said method comprising the steps of:

providing a flow network model in the software program, wherein the flow network model corresponds to the internal network of the enterprise, and comprises plural nodes and plural document flow paths, each of the nodes corresponding to one of the employees, wherein each document flow path is configured by the nodes;

assigning a document processing capacity for each of the nodes in the flow network model, and assigning a document flow rate for each of the document flow paths, so as to form an operation relationship between said document processing capacity and said document flow rate, wherein a group of all the document processing capacities corresponding to the nodes is defined as a capacity vector, and a group of all the document flow rates corresponding to the document flow paths is defined as a flow vector;

determining an acceptable threshold for the total required flow of the flow network model and storing the acceptable threshold in said memory media;

setting up an accept ability test procedure to test all the employees corresponding to each node so as to obtain a probability distribution data, which comprises the probabilities regarding each node successfully processing different capacities, and storing the probability distribution data in said memory media;

searching the probability distribution data in said memory media for selecting out a maximal processing capacity for each node;

running said software program to read the acceptable threshold and the maximal processing capacities in the memory media so as to calculate out all the possible flow vectors in accordance with the operation relationship between the maximal processing capacities and the document flow rates;

calculating out all the possible capacity vectors in accordance with all the possible flow vectors and the operation relationship;

selecting out a minimal capacity vector from all the possible capacity vectors; and calculating a value of system reliability for the flow network model to successfully process the total required flow not less than the acceptable threshold, and showing the value of system reliability in a display screen.

10. The method of claim 9, wherein said plural nodes comprise a source node, a plurality of succeeding nodes and a destination node so that all the document flow paths start from the source node and end at the destination node via the succeeding nodes.

11. The method of claim 9, wherein said plural document flow paths are configured by steps of: defining at least a process precedence relationship between every two nodes; and defining said plural document flow paths in accordance with foregoing process precedence relationships.

12. The method of claim 9, wherein said operation relationship between said document processing capacity and document flow rate comprises that the sum of all document flow rates processed from all document flow paths passing the same employee of node is not greater than a maximal processing capacity.

13. The method of claim 9, wherein said operation relationship between said document processing capacity and document flow rate comprises that in a given time point, the sum of all document flow rates flowed simultaneously from all document flow paths passing the same employee of node is not greater than a current capacity of the node.

14. The method of claim 9, wherein said step of setting up the accept ability test procedure to test all the employees corresponding to each node comprising:

providing plural different test capacities for each employee to undertake capacity test;

recording each testing result of each employee into the memory media of the computer system in a binary digit;

providing a probability mapping function, which comprises a functional relationship between the test capacities, the binary digit and an output value of probability; and running said probability mapping function for calculation the probability distribution data, which comprises the probabilities of that each node successfully processes different capacities.

15. The method of claim 9, wherein said computer system is an Enterprise Resources Planning (ERP) system.

16. The method of claim 9, wherein said computer system is a Customer Relationship Management (CRM) system.

\* \* \* \* \*